United States Patent [19]

Coppola

[11] 4,087,389
[45] May 2, 1978

[54] SEMI-RIGID POLYURETHANE FOAM USED IN PACKAGING

[75] Inventor: Pasquale J. Coppola, Meriden, Conn.

[73] Assignee: Olin Corporation, New Haven, Conn.

[21] Appl. No.: 678,298

[22] Filed: Apr. 19, 1976

[51] Int. Cl.² .................... C08G 18/06; C08G 18/12
[52] U.S. Cl. .............................. 260/2.5 AP; 206/591; 215/DIG. 6; 220/9 F; 260/2.5 AC; 260/77.5 AP; 428/35
[58] Field of Search ............... 260/2.5 AP, 2.5 AM, 260/77.5 AP; 206/591; 215/DIG. 6; 428/35

[56] References Cited

U.S. PATENT DOCUMENTS 3,865,762  2/1975  Repiquet et al. ............... 260/2.5 AP

*Primary Examiner*—Donald E. Czaja
*Assistant Examiner*—H. H. Fletcher
*Attorney, Agent, or Firm*—Robert J. Feltovic; Thomas P. O'Day; F. A. Iskander

[57] ABSTRACT

A select semi-rigid polyurethane foam composition is described for use in packaging fragile or shock-sensitive objects. The foam composition is prepared from a very select reaction mixture which is characterized by high levels of water and an organic foaming agent, and a relatively low reaction mixture NCO/OH index of from about 30 to about 60.

14 Claims, No Drawings

SEMI-RIGID POLYURETHANE FOAM USED IN PACKAGING

This invention relates to the art of packaging fragile or delicate objects. More particularly, the invention relates to a polyurethane foam composition and to its use in packaging such objects.

Due to their fragile or shock-sensitive nature, numerous articles and materials require special protection when they are packaged for shipping or storage. This includes for example electronic instruments, delicate glassware, fragile antiques, shock-sensitive chemicals and so forth. Various ways and shock-absorbing materials have been taught in the art for packaging such items. A well-known practice is to employ a cellular, shock-absorbing plastic material, such as polystyrene or polyurethane foam, to encapsulate or support the fragile article within the confines of a rigid or semi-rigid box or enclosure. See for example U.S. Pat. Nos. 2,897,641, Re. 24,767, 3,190,442, 3,173,535, 3,415,364 and 3,750,871.

Now, according to this invention, a novel semi-rigid polyurethane foam composition has been found which is particularly suited for such packaging applications. Along with being of very low density and therefore relatively low cost, the foam composition of the invention is characterized by reduced shock transmission properties. This foam composition is prepared from a very select reaction mixture which is characterized by high levels of water and an organic foaming agent, and a relatively very low index. The latter is a 100 multiple of the over-all ratio of NCO to OH groups in the mixture. The index of a polyol-polyisocyanate reaction mixture can be calculated using the conventional formula:

$$\text{Index} = \frac{(56100)\ (\text{gm of polyisocyanate})}{\left[\left(\begin{array}{c}\text{Hydroxyl No. of}\\ \text{polyol}\end{array}\right)\left(\text{gm of polyol}\right)\right]\left(\begin{array}{c}\text{amine equivalent}\\ \text{of polyisocyanate}\end{array}\right)}$$

In calculating an over-all index for a reaction mixture including, for example, water and one or more polyols, the bracketed quantity in the denominator of the above formula becomes the sum of the products of the hydroxyl no. of each respective polyol or water multiplied by its respective weight in grams.

More specifically, the reaction mixture from which the foam of the invention is prepared has an index no higher than about 65 and is comprised of the following ingredients:
  a. a polyether polyol,
  b. a polymeric isocyanate,
  c. water in a proportion of about 12–28 parts per every 100 parts by weight of total polyol in the mixture,
  d. an organic foaming agent in a proportion of about 30–60 parts per every 100 parts by weight of total polyol,
  e. a catalyst, and
  f. a silicon-based surfactant.

The above formulation is particularly suited for the on-site generation of polyurethane foam by means of portable foaming equipment. Pursuant to the method of the invention, foam obtained from this formulation is employed, using prior art foam packaging techniques, in cushioning and shock-insulating fragile or shock-sensitive objects.

In making the foams of the invention, it is generally contemplated that any polyether polyol which is useful in making polyurethane foam, can be employed. Usually, however, those polyols are used which are based on the random or step-wise oxyalkylation of polyhydroxy alcohols with a mixture of ethylene oxide and a higher alkylene oxide. A preferred group of such polyols are those characterized by (1) a molecular weight of at least about 4,000, (2) a polyhydroxy alcohol nucleus, (3) polyoxyalkylene chain segments attached to the nucleus, and (4) a ratio of primary to secondary hydroxy groups ranging from about 1.5:1 to about 6:1. Such a polyether polyol can be prepared by methods generally well known in the art wherein, for example, a polyhydroxy alcohol initiator is condensed, in the presence of an alkaline catalyst, first with an alkylene oxide having 3 or more carbon atoms and then with ethylene oxide. Any such polyether polyol, including mixtures thereof, may be used in preparing the foams of the invention.

The polyhydroxy alcohol initiator which is used to prepare the polyether polyol can be any such compound having a functionability of 2–4, i.e., 2–4 hydroxy groups. Illustrative are ethylene glycol, propylene glycol, the butylene glycols such as 1,3-butylene glycol, the pentane diols such as 1,5-pentane diol, the hexane diols such as 1,6-hexane diol, glycerin, trimethylolpropane, triethylolpropane, pentaerythritol mixtures thereof and the like. The most preferred initiators are the aliphatic triols such as glycerin and trimethylolpropane.

In preparing the polyether polyol, a polyhydric alcohol initiator as described above is sequentially condensed, in the presence of an alkaline catalyst such as potassium hydroxide, first with an alkylene oxide having 3–8, and preferably 3–4 carbon atoms and then with ethylene oxide. Illustrative of the alkylene oxides which are first condensed with the alcohol initiator are propylene oxide, butylene oxide, pentylene oxide, mixtures thereof and the like, propylene oxide being most preferred. In carrying out the sequential condensation reactions, such amounts of ethylene oxide and higher alkylene oxide are employed as to provide a polyether having a molecular weight of at least about 4,000, and in which polyether the ratio of primary to secondary hydroxy groups is from about 1:1 to about 6:1. Preferably, the polyether polyol has a molecular weight of about 4,500–7,500 and a ratio of primary to secondary hydroxyl groups ranging from about 1.5:1 to about 5:1. The most preferred polyether polyols for use according to the invention are oxypropylated, oxyethylated aliphatic triols having a molecular weight of about 5,000–7,000 and a ratio of primary to secondary hydroxy groups ranging from about 2:1 to about 4.5:1.

The organic isocyanate reactant which is used in preparing the foam of the invention is a polymeric polyisocyanate. Any such material, as conventionally used in polyurethane foam production, may be employed, including mixtures containing one or more polymeric polyisocyanates. Illustrative such materials are described in U.S. Pat. Nos. 2,683,730, which issued July 13, 1954 to Seager et al., and 3,341,463 which issued to Gemeinhardt on Sept. 12, 1967. The entire disclosures of these two patents are incorporated herein by reference.

Typical polymeric polyisocyanates are mixtures of polyisocyanates represented by formula I below wherein n is a number from 0 to 5 and R is hydrogen or lower alkyl (i.e., 1–4 carbons):

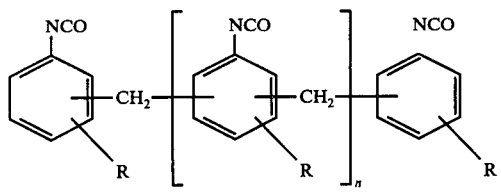

The preferred polymeric isocyanates are the polymethylene polyphenylisocyanates such as can be purchased commercially for use in polyurethane foam production. These are mixtures containing one or more polyisocyanates as represented by formula I above wherein R is hydrogen. Especially preferred polymethylene polyphenylisocyanates are those which have an average NCO functionability ranging from 2.1 to 3.5 and still more preferably about 2.3–3.0. It is to be understood that, as used in the specification and claims herein, the terms "polymeric polyisocyanate" and "polymethylene polyphenylisocyanate" are intended to include mixtures containing one or more such polyisocyanates. Further details concerning these compositions and their preparation are provided in the above-noted Seager et al. and Gemeinhardt patents.

Such a proportion of the polymeric isocyanate is employed as to provide in the foam forming reaction mixture, including polyols and water, an over-all index no greater than about 65, such as from about 30 to about 60, preferably about 35–55, and still more preferably about 42–52.

In preparing the polyurethane foam of the invention, there is employed a dual foaming agent, namely, water and an organic foaming agent. The latter is exemplified by the halogenated hydrocarbons, more specifically the halogenated alkanes, such as trichloromonofluoromethane, dichloromonofluoromethane, dichlorodifluoromethane, 1,1,2-trichloro-1,2,2-trifluoroethane, dichlorotetrafluoroethane, methylene chloride, chloroform, carbon tetrachloride, mixtures thereof and the like. The most preferred organic foaming agent is trichloromonofluoromethane.

Both the water and the organic foaming agent are employed in relatively high levels, a high level of water being required to contribute to the low density requirements and also to achieve the index specified above and prevent foam shrinkage; whereas a high level of the organic foaming agent is necessary so that, in combination with the water, the requisite low density is realized. Thus water is employed in a proportion ranging from about 12 to about 28, and preferably about 14–24, parts per every 100 parts by weight of total polyol in the foam forming reaction mixture. A most preferred range is about 16–22 parts of water per 100 parts of total polyol. As for the organic foaming agent, this is generally employed in a proportion of about 32–60, preferably about 38–52, and still more preferably about 40–50, parts per 100 parts by weight of total polyol.

The foam forming reaction mixture also includes a catalyst. Any such material may be used which is an effective catalyst for polyurethane foam production. Typical are the tertiary amines of which the following are illustrative: trimethylamine, triethylamine, triethylene diamine, tetramethylene diamine, tetramethylbutane diamine, N-methylmorpholine, N-ethylmorpholine, dimethylpiperazine, trimethylaminoethylpiperazine, dimethylcyclohexylamine, bis(dimethylaminoethylether), methyldicyclohexylamine, N-cyclohexylmorpholine, methyldiethanolamine and dimethylethanolamine. The amine is employed in catalytic proportions, i.e., proportions that are sufficient to catalyze the polyurethane foam forming reaction. Illustratively, such proportions may vary, depending on the particular catalyst used, from a low of about 0.1 to a high of about 12 parts per every 100 parts by weight of total polyol in the reaction mixture.

The foam forming reaction is effected in the presence of a silicon-based surfactant which is necessary in order to prevent the foam from collapsing and further to obtain a foam having a uniform and acceptable cellular structure. For this purpose, any of the conventionally used silicon-based surfactants, such as the silicone oils and the siloxane oxyalkylene block copolymers, may be employed. Generally, however, it is preferred to employ a silicon-based surfactant that is non-hydrolyzable. Such surfactants are characterized by silicon-carbon linkages that are stable in water or water-containing pre-mixes. This stability is predicated on the absence of Si—O—C bonds in the molecule. Representative such surfactants are the non-hydrolyzable silicon-glycol copolymers which are described in the *Journal of Cellular Plastics,* March/April, 1973 issue, pp. 99–102; and the siloxane-polyether urethane copolymers, described in U.S. Pat. No. 3,246,048 which issued Apr. 12, 1966 to Haluska. The entire disclosures of both of those references are incorporated herein by reference.

The use of a non-hydrolyzable silicon-based surfactant is important particularly in those preferred embodiments of the invention wherein the foam is generated on-site by means of a portable foaming apparatus. In such an apparatus the polyol, catalyst, surfactant and foaming agent, which in this case includes a substantial proportion of water, are usually combined in, and supplied from, one reactant supply tank. Thus a non-hydrolyzable surfactant is required which would not become hydrolyzed or degraded as a result of being admixed and subjected to prolonged contact with the water.

The silicon-based surfactant is preferably employed in a proportion from about 1.4 to about 3.2 parts per every 100 parts by weight of total polyol. This is in order to prevent the foam from collapsing, when too little surfactant is used, and also to avoid foam shrinkage when too high a level of the surfactant is used. A more preferred surfactant level is about 1.8–3.0 parts per 100 parts by weight of total polyol.

As indicated above, the polyurethane foam forming mixture of the invention is particularly suited for the on-site generation of foam by means of portable foaming apparatus. Illustrative such apparatus are disclosed in U.S. Pat. Nos. 3,769,232, which issued Oct. 30, 1973 to Houldridge, and 3,541,023, issued Nov. 17, 1970 to Cole. The entire disclosures of both of these patents are incorporated herein by reference.

Typically, the portable foaming apparatus comprises at least two reactants supply tanks, a static mixer for mixing the reactants, and means for expelling the reactants from their respective tanks through the static mixer and onto a surface or into a mold where the foaming reaction takes place. Preferably the polymeric isocyanate and part of the organic foaming agent are supplied from one tank, while the other reactants, including the balance of the foaming agent, are supplied from the other tank. Here, in order to achieve adequate dissolution or retention of the organic foaming agent into polymeric isocyanate, the latter is preferably provided in the form of a prepolymer thereof. To this end, it is mixed and reacted with a relatively small proportion of a polyol. The latter can be the same polyol described hereinabove for use in making the foams of the invention; or, alternatively, it can be any other polyol having 2–8 hydroxy groups which is reactive with an organic polyisocyanate to form a polyurethane. A particularly preferred polyol for use in making the isocyanate-terminated prepolymer is a chlorinated polyether polyol, having an average hydroxyl number of about 250–600, and more preferably about 300–450, which is obtained by condensing 4,4,4-trichloro-1,2-epoxybutane with a polyhydroxy compound or a mixture of such compounds. Such polyols and their preparation are described in U.S. Pat. No. 3,741,921, issued June 26, 1973 to M. Lapkin, the entire disclosure of which is incorporated herein by reference. Such proportions of polyol are used as to provide an isocyanate-terminated prepolymer having a ratio of NCO:OH groups ranging from about 10:1 to about 100:1.

When practicing the method of the invention in the on-site generation of foam, i.e., by means of a portable apparatus, adequate mixing of the various ingredients may not be attainable by the sole expedient of using a static mixer. Due to the highly selective nature of the foam forming mixture used herein, this is often the case even when a frothing agent is included in the mixture. Therefore, desirably some additional expedient is used to enhance the function of the static mixer. One such expedient is the utilization of an inert gas, e.g., nitrogen, as a nucleating agent. This practice is described in detail is U.S. Pat. No. 3,882,052, issued May 6, 1975 to Raynor et al., the entire disclosure of which is incorporated by reference herein.

It is also preferred, when foaming is carried out on-site by means of a portable apparatus, that the dispensation of the foam forming mixture be effected at a temperature of about 70°–100° F, and more preferably about 73°–87° F. The reason is that temperatures below about 70° F may result in an increase in the viscosity of the reactants thereby hindering their smooth flow through the portable foaming equipment and also making it difficult to regulate and control the relative proportions of isocyanate and polyol flowing from their respective tanks into and out of the static mixer. On the other hand, temperatures above about 100° F may cause the organic foaming agent to flash as it exits from the foaming apparatus, and this in turn would lead to undesirable variations in the density of the resulting foam.

In accordance with an especially preferred embodiment of the invention, semi-rigid foam is generated on-site, by means of a portable foaming apparatus, from a polyurethane foam forming reaction mixture having an over-all index ranging from about 35 to about 55, which mixture is comprised of the following ingredients:

A. An oxypropylated then oxyethylated triol having a molecular weight of about 5,000–7,000, and still more preferably about 5,600–6,600. This triol, furthermore, has a ratio of primary to secondary hydroxy groups ranging from about 1.5:1 to about 5:1. The most preferred such triol is one obtained by condensing one mole of glycerin first with about 85–100 moles of propylene oxide and then with about 10–15 moles of ethylene oxide.

B. An isocyanate-terminated prepolymer having a ratio of NCO:OH groups from about 20:1 to about 90:1. This prepolymer is prepared by reacting polymethylene polyphenylisocyanate having an average NCO functionability of about 2.3–3.0 with a polyether polyol having an average of 2–8, and still more preferably 3–6, hydroxy groups. The most preferred polyol for use in making the prepolymer is one having an average hydroxyl number of about 300–450 which is the product of condensing 4,4,4-trichloro-1,2-epoxybutane with a mixture of dextrose and ethylene glycol.

C. Water in a proportion of about 16–22 parts per every 100 parts by weight of total polyol in the mixture, which includes the polyol used in making the isocyanate-terminated prepolymer.

D. Trichloromonofluoromethane in a proportion of about 38–52 parts per every 100 parts by weight of total polyol in the mixture.

E. A catalytic proportion of a tertiary amine catalyst.

F. A non-hydrolyzable silicon-based surfactant in a proportion of about 1.8–3.0 parts per every 100 parts by weight of total polyol in the mixture.

In addition to the above-described ingredients, the foam forming reaction mixture may include other additives which serve a certain function or impart certain properties to the foam. This includes for example colorants, flame retardant additives and so forth. Additionally, a low-molecular weight polyether diol or triol may be included to reduce the viscosity of the foam-forming mixture and/or to further improve its water retention.

Foams prepared according to the invention are semi-rigid and substantially open-cell. They are further characterized by a combination of very low density, e.g., 0.45–0.75 pounds per cubic foot, and low shock-transmission properties as determined by the test described in ASTM D-1596-64. As such, the foams of the invention are highly suitable, from a practical and economic standpoint, for use in packaging fragile or shock-sensitive articles and materials.

In utilizing these foams for packaging fragile articles pursuant to the method of the invention, any suitable prior art technique may be used. For example, the fragile article may first be placed or suspended inside a cardboard or wooden box, and the space between the article and the interior walls of the box is then filled with the foam. Another technique is to prepare pre-molded sections of foam which are then used to enclose the fragile article. Various other methods of packaging may be used as described or practiced in the art. Thus the improved foam formulation disclosed herein may be used in the practice of any prior art method for packaging fragile articles.

The following examples are provided to illustrate the invention. The foaming apparatus used in these examples was identical to the apparatus disclosed in the above-noted Houldridge U.S. Pat. No. 3,769,232, except that it did not include the valved timing assembly embodied in the apparatus of that patent. Thus the apparatus comprised (a) a first supply tank for supplying the isocyanate reactant, and part of the organic foaming agent, (b) a second supply tank for supplying the other foam forming ingredients, (c) a nitrogen pressure tank having a valved outlet in communication, via a distributing valve, with the inlets to the two supply tanks, (d) a static mixer having one outlet and two inlets communicating with the supply tanks outlets, and (e) adjustable flow control units interposed in the conduits linking the supply tank with the static mixer.

Further in the examples, all parts and percentages are by weight, unless otherwise specified.

EXAMPLE 1

The portable foaming apparatus referred to above was used to prepare a non-froth semi-rigid polyurethane foam having a density of 0.50 pounds per cubic foot.

The foam forming ingredients were supplied from two cylindrical, metal tanks. In one tank, there were provided an isocyanate-terminated prepolymer and, per every 100 parts by weight of the prepolymer, 17.5 parts of trichloromonofluoromethane. The prepolymer, which had an NCO:OH ratio of 48.6:1, was the product of mixing and reacting together 97.7 parts of polymethylene polyphenylisocyanate with 2.3 parts of a polyether polyol which had an average hydroxyl number of 365 and was the product of reacting 4,4,4-trichloro-1,2-epoxybutane with an equi-molar mixture of ethylene glycol and dextrose. Purchased commercially under the trademark "PAPI 135," the polymethylene polyphenylisocyanate had an amine equivalent of 134, a viscosity of 200 cps. at 25° C and an average NCO functionability between 2.6 and 2.7.

The second supply tank contained the following ingredients in the indicated proportions:

| Ingredients | Parts by Weight |
|---|---|
| First polyol[1] | 57.24 |
| Second polyol[2] | 6.78 |
| Trichloromonofluoromethane | 15.06 |
| Water | 12.05 |
| Silicon-based surfactant[3] | 1.51 |
| Dimethylethanolamine catalyst | 7.36 |

[1]This is a polyether triol having a molecular weight of 5803 which is the product of condensing glycerin first with 90.6 moles of propylene oxide and then with 12.7 moles of ethylene oxide.
[2]This is a polyether diol having a molecular weight of 2000 which is the product of condensing dipropylene glycol first with propylene oxide and then with 20 moles of ethylene oxide.
[3]This surfactant is a silicone-glycol copolymer having no-Si-O-C bonds n the molecule. It is a product of Union Carbide, sold under the designation or trademark "L-540", and further described in the 1973-1974 edition of a Union Carbide publication entitled "Chemicals and Plastics Physical Properties".

The above ingredients, having an over-all index of about 53, were dispensed into a square cardboard box. The foaming reaction took place instantly and was completed shortly thereafter. A uniform, substantially open-cell semi-rigid cellular product was thus obtained which exhibited no collapse or shrinkage.

Comparisons 1–2

These comparisons are provided to demonstrate the criticality of the low index and high water content in making the foams of the invention. In both comparisons, the identical procedure of Example 1 was followed except for variations in the level of water used. Thus in Comparison 1, no water at all was included in the formulation which therefore had a calculated over-all index of about 2046, more than double that of the Example 1 formulation; and in Comparison 2, a low level of water was used, specifically 7.05 parts, as contrasted with the 12.05 parts used in Example 1. At this low water level, the foam formulation had a calculated over-all index of about 90.

As a result of this variation, practically no expansion or foaming reaction was observed upon dispensation of the Comparison 1 formulation. As for Comparison 2, a foaming reaction did take place but there was substantial foam shrinkage thereafter.

EXAMPLES 2–3

The identical procedure of Example 1 was followed except that instead of 1.51 parts of the surfactant, one part was used in Example 2 and 2 parts were used in Example 3. Both reaction mixtures had an over-all index of about 53. In each case, the resulting foam was of uniform quality and exhibited only very slight shrinkage.

Comparisons 3–4

These comparisons are provided to illustrate the criticality of the surfactant level used in preparing the foams of the invention. Here again the identical procedure of Examples 1–3 was followed except that no surfactant was used in Comparison 3 and in Comparison 4, 3 parts of the surfactant were provided in the second reactants supply tank. This surfactant level is equivalent to about 4 parts per every 100 parts of total polyols in the foaming formulation, which is well above the upper limit specified according to the invention. Both reaction mixtures had an over-all index of about 53.

As a result of these variations, the foam of Comparison 3, wherein no surfactant was used, had an irregular cellular structure; whereas the foam of Comparison 4, in which too high a level of surfactant was used, exhibited excessive shrinkage.

EXAMPLE 4

The identical formulation and procedure of Example 1 were used to encapsulate a glass flask with foam. Thus the formulation was dispensed into a cardboard box measuring 12 × 12 × 12 inches, a sufficient amount being placed in the box to fill it with foam to a height of 6 inches. After about 45 seconds, during which time a foam gel was formed, a glass flask was immersed halfway into the foam. The flask was preparatorily wrapped with a film of polyethylene to prevent adhesion of the foam to the outer surface of the flask. After so immersing the flask into the foam gel, further foam dispensation was resumed so as to fill the box and thereby completely envelope the flask with foam.

When the foam was completely cured, it was trimmed so as to leave a layer about 1 to 1½ inches thick surrounding the flask. To test the protective and shock-insulating properties of the foam, the flask, with the layer of foam enveloping it, was dropped from a height of 60 feet onto a concrete surface. This procedure was repeated again. Thereafter, the foam envelope was removed, and the flask was visually checked for any breakage, fractures or chips. None were noted. Rather the flask was completely intact.

What is claimed is:

1. A semi-rigid polyurethane foam prepared from a reaction mixture having an over-all index from about 30 to about 60, which mixture comprises:
   a. a polyether polyol characterized by (1) a molecular weight of at least 4,000, (2) a polyhydroxy alcohol nucleus having a functionability of 2–4, (3) polyoxyalkylene chain segments attached to said nucleus and (4) a ratio of primary to secondary hydroxy groups ranging from about 1:1 to about 6:1.
   b. a polymeric polyisocyanate,
   c. water in a proportion of about 12–28 parts per every 100 parts by weight of total polyol in said mixture, d. a halogenated hydrocarbon foaming agent in a proportion of about 30–60 parts per every 100 parts by weight of total polyol in said mixture, e. an amine catalyst, and f. a non-hydrolyzable silicon-based surfactant in a proportion of about 1.5–3.2 parts per every 100 parts by weight of total polyol in said mixture.

2. The polyurethane foam of claim 1 wherein said polyether polyol is a triol having a molecular weight of about 4,500–7,500 and a ratio of primary to secondary hydroxyl groups ranging from about 1.5:1 to about 5:1.

3. The polyurethane foam of claim 2 wherein said polymeric polyisocyanate is polymethylene polyphenylisocyanate having an average NCO functionability of about 2.1–3.5.

4. The polyurethane foam of claim 3 wherein a. said polyether polyol is an oxypropylated then oxyethylated aliphatic triol having a ratio of primary to secondary hydroxyl groups from about 2:1 to about 4.5:1, b. said amine catalyst is a tertiary amine, and c. said halogenated hydrocarbon foaming agent is trichloromonofluoromethane.

5. The polyurethane foam of claim 4 wherein per every 100 parts by weight of total polyol in said mixture, there are employed:

a. about 14–24 parts of said water, b. about 38–52 parts of said trichloromonofluoromethane, and c. about 1.8–3.0 parts of said silicon-based surfactant.

6. The polyurethane foam of claim 5 wherein said index ranges from about 35 to about 55 and said polymethylene polyphenylisocyanate has an average NCO functionability of about 2.3–3.0.

7. The polyurethane foam of claim 6 wherein said polymethylene polyphenylisocyanate is employed in the form of an isocyanate-terminated prepolymer thereof with a polyol having 2–8 hydroxy groups, said prepolymer having a ratio of NCO:OH groups ranging from about 10:1 to about 100:1.

8. A polyurethane foam as claimed in claim 7 which is prepared from a reaction mixture having an index of about 42–52 and comprises a. a polyether triol which is the product of condensing glycerin first with about 85–100 moles of propylene oxide and then with about 10–15 moles of ethylene oxide, b. an isocyanate-terminated prepolymer having a ratio of NCO:OH groups from about 20:1 to about 90:1 which is the product of reacting (1) polymethylene polyphenylisocyanate having an average NCO functionability of about 2.3–3.0 with (2) a polyether polyol having an average hydroxyl number of about 300–450 which is the product of condensing 4,4,4-trichloro-1,2-epoxybutane with a mixture of dextrose and ethylene glycol, c. water in a proportion of about 16–22 parts per every 100 parts by weight of total polyol in said mixture, d. trichloromonofluoromethane in a proportion of about 38–52 parts per every 100 parts of total polyol in said mixture, e. a catalytic proportion of a tertiary amine catalyst, and f. a non-hydrolyzable silicon-based surfactant in a proportion of about 1.8–3.0 parts per every 100 parts by weight by total polyol in said mixture.

9. A process wherein the polyurethane foam of claim 1 is generated on-site by means of a portable foaming apparatus.

10. A process wherein the polyurethane foam of claim 4 is generated on-site by means of a portable foaming apparatus.

11. A process wherein the polyurethane foam of claim 7 is generated on-site by means of a portable foaming apparatus.

12. A process wherein the polyurethane foam of claim 8 is generated on-site by means of a portable foaming apparatus.

13. In a method for packaging fragile articles with a cellular, shock-absorbing material, the improvement of using as said cellular material the polyurethane foam of claim 1.

14. In a method for packaging fragile articles with a cellular, shock-absorbing material, the improvement of using as said material the polyurethane foam of claim 8.

* * * * *